April 25, 1967  C. E. GUTSHALL  3,315,720
NON-CRAZING SPRING WASHER
Filed Oct. 20, 1965
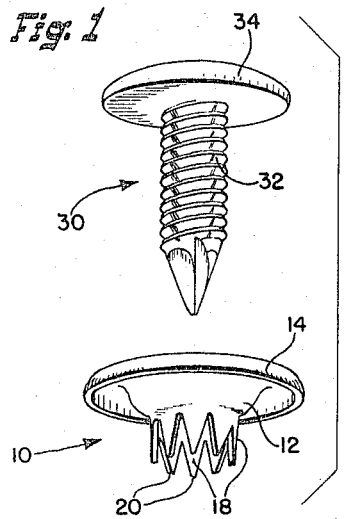
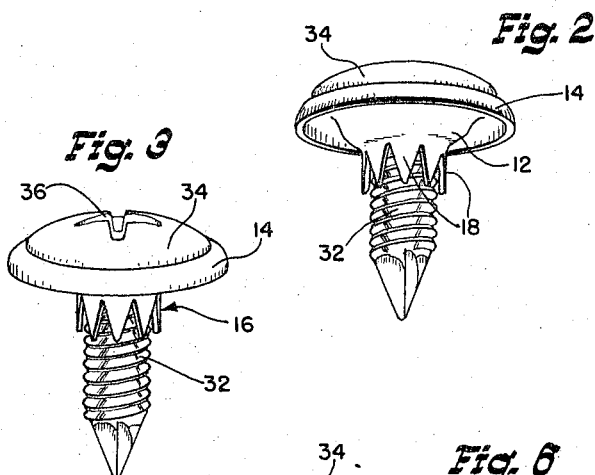
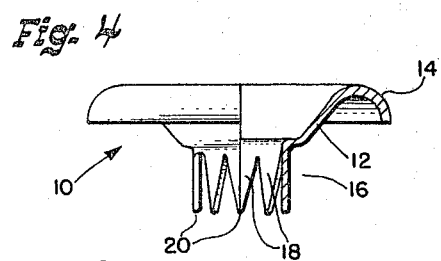
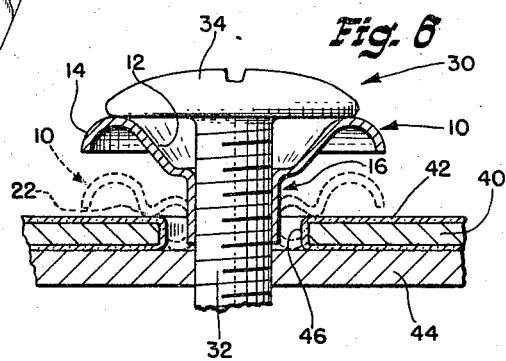
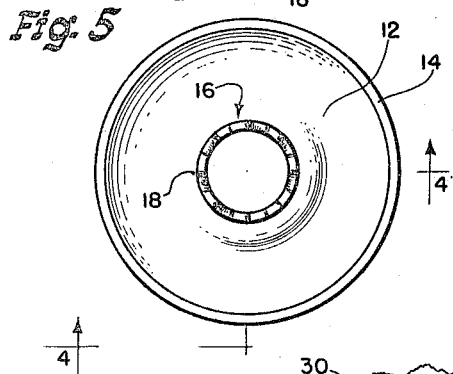
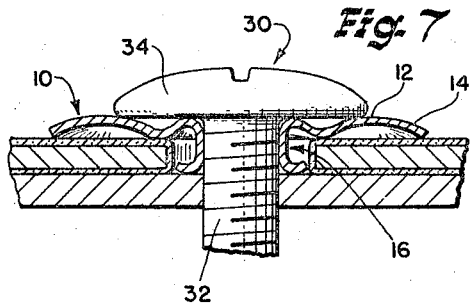
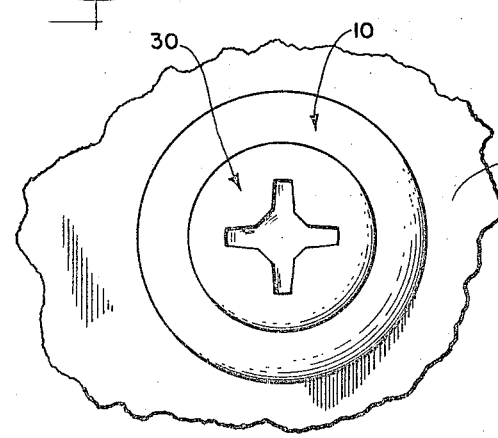
INVENTOR.
Charles E. Gutshall
BY
His Att'ys United States Patent Office 3,315,720
Patented Apr. 25, 1967

3,315,720
NON-CRAZING SPRING WASHER
Charles E. Gutshall, Roselle, Ill., assignor to Illinois Tool
Works Inc., Chicago, Ill., a corporation of Delaware
Filed Oct. 20, 1965, Ser. No. 498,647
4 Claims. (Cl. 151—38)

The present invention relates to a new and improved spring washer, and more particularly, to a spring washer for use primarily with workpieces subject to crazing or chipping There are many types of spring action washers which provide spring tension in various degrees as required by operating conditions. Common forms of such washers include, by way of example, the toothed, dished and domed variety, but this is by no means exhaustive as there are many other specially configured washers which do not fall in a particular category, and yet which provide the required spring tension for fastener assembly.

In some instances, spring action washers are used in environments where it is important to prevent crazing or chipping of a workpiece, such as enamel or porcelain surfaces found on many kitchen and laundry appliances. Such surfaces are not capable of withstanding the abuse to which they are subjected by most spring action washers since it will be recognized that it is necessary to compress a spring washer against a supporting surface to obtain the desired spring tension, and if this surface has a porcelain or enamel finish, damage will result in the vicinity of the fastener assembly thus producing an unsightly appearance. Protective coatings or separate fastener components for shielding a workpiece surface have been suggested, but the cost and appearance of these proposals have not been entirely satisfactory.

Accordingly, it is an object of the present invention to provide a new and improved spring action washer which prevents crazing or chipping of a workpiece when driven thereagainst by a rotary fastener or the like.

Another object of the present invention is to provide a spring action washer which, in addition to the aforementioned object, spreads the pressure per unit bearing area of the washer over an appreciable area.

Yet another object of the present invention is the provision of a spring action washer which maintains a predetermined compressive force against a workpiece without material losses of its spring tension characteristics.

A still further object of the present invention is the provision of a spring action washer which reduces or eliminates dimensional differences between a workpiece aperture and a rotary fastener with which it is associated while also absorbing some of the driving forces of said fastener.

Still another object of the present invention is the provision of a spring action washer which is attractive in appearance, and which is relatively inexpensive to manufacture as compared with prior art proposals.

Other and further objects and advantages will become apparent from the following description when read in connection with the accompanying drawings wherein:

FIG. 1 is an exploded perspective view of a fastener assembly including a headed rotary threaded fastener and a spring action washer incorporating the principles of the present invention;

FIG. 2 is a perspective view of the fastener and washer shown in FIG. 1 preassembled into one another and illustrating the undersurface of the washer and the lower end portion of the fastener;

FIG. 3 is also a perspective view similar to FIG. 2, but showing the fastener assembly as viewed from an angle above the rotary fastener head;

FIG. 4 is an enlarged elevational view, partly in section, of the spring action washer of the present invention;

FIG. 5 is an enlarged bottom plan view of the spring action washer shown in FIG. 4;

FIG. 6 is an enlarged side elevational view, partly in section, of the washer and fastener and washer assembly prior to being moved against a confronting workpiece surface;

FIG. 7 is a side elevational view, partly in section, similar to FIG. 6, and showing the washer compressed between the head of the fastener and the confronting workpiece surface; and FIG. 8 is an enlarged top plan view of the fastener assembly in the position shown in FIG. 7.

Referring now to the drawings, and first to FIGS. 1–5, there will be seen a spring action washer 10 which is preferably made from a relatively soft metal such as aluminum, copper, brass, some forms of steel, and the like for reasons which will appear hereinafter. When applied to a workpiece, a rotary threaded fastener 30 is preferably employed in connection therewith, and if at all possible, the fastener 30 is preassembled to the washer 10 in the manner set forth in the discussion that follows.

The washer 10 includes a flaring body portion 12 which is generally of the inverted frusto-conical variety as best seen in FIGS. 1 and 4, the upper end of which terminates in a reversely directed or curving lip portion 14 which is of smaller axial height than the flaring hollow body portion 12. Extending from the lower end of the body portion 12 is a generally axially directed annular hub portion 16 which includes a plurality of circumferentially spaced depending fingers or prongs 18 having a teeth-like configuration. Each of the depending fingers or prongs 18 extends generally from the area of juncture of the hub and hollow portion and teminates in a relatively sharp entering end portion 20.

The internal diameter of the hub portion 16 is preferably less than that of the outer diameter of threaded shank 32 provided on the fastener 30 such that by moving the fastener and washer into relative interfitting relationship, the washer will be retained by the fastener. Of course, the internal diameter of hub portion 16 is not so small that it would be impossible to relatively assemble the screw and washer to each other. It should be further noted that the maximum transverse diameter of the washer in the vicinity of the juncture between the flaring hollow body portion 12 and the reversely directed lip portion 14 is less than the maximum transverse dimension of the fastener head 34 for abutting engagement therewith as seen in FIGS. 2–3 and 6. The fastener head 34 has a tool engaging slot area 36 to promote driving engagement with an appropriately configured tool and the slotted area of the fastener head.

The washer-fastener assembly is principally used with workpieces subject to crazing or chipping, such as enamel or porcelain coated panels. In FIGS. 6–7 of the drawing the apertured workpiece 40 has a coating 42 of this last mentioned type, it being understood that either of the workpieces to be secured to one another, here designated as 40, 44 respectively, may be provided with an enamel or porcelainized finish as desired.

The workpiece or panel 40 has an aperture 46 extending therethrough which has a predetermined diameter of sufficient size to freely accept the washer and fastener assembly as best seen in FIG. 6. As an important feature of the present invention, it is to be noted that axial length of the hub portion 16 is sufficiently greater than the thickness of the workpiece or panel 40 to cause the sharp entering end portion 20 of the teeth-like fingers or prongs 18 to abut against the upper face of the workpiece or panel 44 when the rotary fastener 30 is driven or tightened thereagainst. More particularly, it will be seen that the fastener head 34 engages the reversely directed lip portion 14 of the washer 10 upon imparting torque to the fastener 30 such that the applied forces will first be transmitted, through body portion 14, and thence through the annular hub 16. Since the washer is made of a relatively soft metal, the circumferentially spaced fingers or prongs 18 will readily collapse as they are forced against the workpiece or panel 14 to cause the lower end portions thereof to move radially outwardly in the path of least resistance.

The collapsing of the annular hub portion 16 has a threefold effect. First, the collapse will enable the annular portion 16 to initially absorb the opposing forces to which the washer 10 is subjected, namely, the driving force of the fastener 30 and the confronting force presented by the workpiece 44, prior to bringing the reversely directed lip portion 14 into engagement with the workpiece. As a second aspect of the collapse, the overall axial height of the washer 10 will be reduced, thus moving the reversely directed lip portion 14 closer to the upper surface of the workpiece. The third effect created by the collapse of the annular hub portion 16 is that the fingers or prongs 18 will "fill" the gap existing between the threaded shank 32 of the fastener and the surrounding marginal portions of the aperture 46 so as to reduce the dimensional differences therebetween and provide a stable mounting for the washer 10 within the workpiece 40.

The collapse of the annular hub portion is not sufficient by itself to move the reversely directed lip portion into contact with the upper surface of the workpiece or panel 40, and to accomplish this, a second collapse of the washer in an axial direction is contemplated. When the annular hub portion 16 of the washer is completely collapsed, the washer 10 will assume the dotted line shape shown in FIG. 6 of the drawing. In this intermediate stage, a bearing area 22 in the vicinity of the junction between the body portion 12 and the hub portion 16 will be created such that upon further downward movement of the reversely directed lip portion 14, a second or further collapse of the washer will take place in the vicinity of the bearing area 22. This second collapse is sufficient to move the reversely directed lip portion 14 against the workpiece 40, but this does not occur until final stages of fastener tightening. As a result, there will be little or no crazing or chipping of the enamel, porcelain or other brittle coating since the second collapse moves the pressure point of the washer an appreciable distance from the workpiece aperture to distribute the pressure per unit area of the washer on the workpiece 40 over a substantial distance. Chipping or crazing of the workpiece beginning at the aperture 46 is lessened by this distribution of load bearing pressure.

When the washer 10 assumes its final configuration as seen in FIGS. 7–8, the upper end of the hub portion 16 engages the undersurface of the fastener head 34 to prevent complete compression of the hollow body portion 12 and its reversely directed lip portion 14 for maintaining a predetermined amount of spring tension in the washer. This is desirable in preventing the retrograde movement of the fastener 30 as is well known.

It will be apparent that many modifications of the present invention are possible. For example, the sharp entering end 20 of the fingers or prongs 18 may bear directly against an internal shoulder provided on the workpiece 40 rather than abutting against the upper face of the workpiece 44. It is also possible to use another applied force derived from a rotary net component or the like to position the designated areas of the washer 10 against the workpiece 40. Various other modifications such as the shape of the fingers or prongs 18, the degree of inclination of the body portion 12 and reversely directed lip portion 14 are possible, and are to be considered as coming within the scope of the present invention.

From the foregoing, it will be appreciated that the present invention discloses a novel spring washer which eliminates or substantially reduces the possibility of workpiece crazing or chipping. It has been found that the washer of the present invention can be subjected to approximately the force required to cause failure of the fastener or screw without subjecting the workpiece to crazing or chipping. This, together with the other attendant advantages as heretofore enumerated, results in a very desirable product for many commercial uses.

The specific embodiment of the invention as shown and described herein is for illustrative purposes only. Various changes in structure will no doubt occur to those skilled in the art, and will be understood as forming a part of this invention insofar as they fall within the spirit and scope of the appended claims.

I claim:

1. A fastener unit including a washer and a headed rotary threaded fastener which is preassembled with said washer, said fastener unit adapted for use with an apertured workpiece of a predetermined thickness which is subject to crazing, said washer including an inverted generally flared body portion which terminates at its larger upper end in a reversely directed lip portion of smaller axial height than said body portion, said lip portion terminating in a substantially smooth continuous annular surface, said body portion having integral with its lower end a generally axially directed annular hub portion of sufficiently smaller predetermined diameter than the aperture provided in said workpiece so as to be freely accepted therein but said hub being of sufficient diameter to internally accept at least a part of said hub portion and the area in the vicinity of said hub and flared body portions being collapsible when the reversely directed lip portion and the lower terminus of said hub portion are compressed by opposing forces presented by the head of said rotary threaded fastener and an opposed work surface means to enable said hub portion to initially absorb the opposing forces prior to bringing said reversely directed lip portion into engagement with said workpiece, the axial height of said hub portion being at least as great as the predetermined thickness of said workpiece to prevent engagement of said rotary threaded fastener with all portions surrounding the workpiece aperture, said axial height of said hub portion being sufficient to cause the upper end thereof to engage the undersurface of said rotary fastener head and prevent complete compression of said hollow portion and its reversely directed lip portion, the head of said rotary threaded fastener having a diameter at least equal to the termination of said upper end of said flared body portion whereby said head engages the washer over a broad area, the terminal edge of said reversely directed lip portion engaging said workpiece at an appreciable distance from the aperture thereof to distribute the pressure per unit area of said washer on said workpiece and thereby eliminate crazing.

2. The washer as defined in claim 1 wherein the opposing work surface means contacting the lower terminus of said hub portion is an apertured second workpiece positioned beneath said first workpiece and adapted to be threadably engaged by said rotary threaded fastener.

3. The washer as defined in claim 1 wherein said hub portion is collapsed in a manner to eliminate the dimensional differences between the rotary threaded fastener and the workpiece aperture.

4. The washer as defined in claim 1 wherein said hub portion comprises a plurality of circumferentially spaced collapsible depending fingers extending downwardly from the area of juncture of said hub portion with said hollow body portion.

References Cited by the Examiner
UNITED STATES PATENTS

| | | | |
|---|---|---|---|
| 1,301,302 | 4/1919 | Nolan | 85—50 |
| 1,640,650 | 8/1927 | Ehrhardt | 151—38 |

CARL W. TOMLIN, *Primary Examiner.*

R. S. BRITTS, *Assistant Examiner.*